(12) United States Patent
Wolleschensky

(10) Patent No.: US 6,888,680 B2
(45) Date of Patent: May 3, 2005

(54) OPTICAL ARRANGEMENT FOR OBTAINING INFORMATION FROM A SAMPLE OR AN OBSERVED OBJECT

(75) Inventor: Ralf Wolleschensky, Schoeten (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/458,699

(22) Filed: Jun. 10, 2003

(65) Prior Publication Data

US 2003/0231408 A1 Dec. 18, 2003

(30) Foreign Application Priority Data

Jun. 15, 2002 (DE) .......................................... 102 27 119

(51) Int. Cl.[7] .......................... G02B 26/08; G02B 27/14; G02B 5/08; G02B 5/26
(52) U.S. Cl. .......................... 359/629; 359/208; 359/839
(58) Field of Search .......................... 359/625–626, 359/629, 636, 638–639, 203, 208, 212, 196, 365, 858, 202, 839

(56) References Cited

U.S. PATENT DOCUMENTS 5,557,447 A * 9/1996 Taylor .......................... 359/208
6,078,420 A * 6/2000 Macken .......................... 359/208

* cited by examiner

Primary Examiner—Hung Xuan Dang
Assistant Examiner—Joseph Martinez
(74) Attorney, Agent, or Firm—Reed Smith LLP

(57) ABSTRACT

An optical arrangement is disclosed for obtaining information from a sample or an observed object which comprises a light source for illuminating the sample or observed object and a reception device for the light proceeding from the sample or observed object. At least one beam splitter is included having a splitter surface with a transmittive area and a reflective area. Light from the source is directed to the splitter surface, reflected by the reflective area of the splitter surface to a concave mirror, focused by the concave mirror onto the transmittive area and passes through the latter, or the light is focused onto the transmittive area, passes through the latter to a concave mirror, is directed from the concave mirror to the splitter surface and is deflected by the reflective area of the latter. The focusing is influenced by the geometry of the mirror surface of the concave mirror and the distance between the concave mirror and the splitter surface. A selected beam expansion is predetermined and/or the wavefront of the light is manipulated for purposes of optimally adapting the light to the characteristics of the rest of the optical component groups and/or the optical characteristics of the sample or of the observation object.

24 Claims, 6 Drawing Sheets

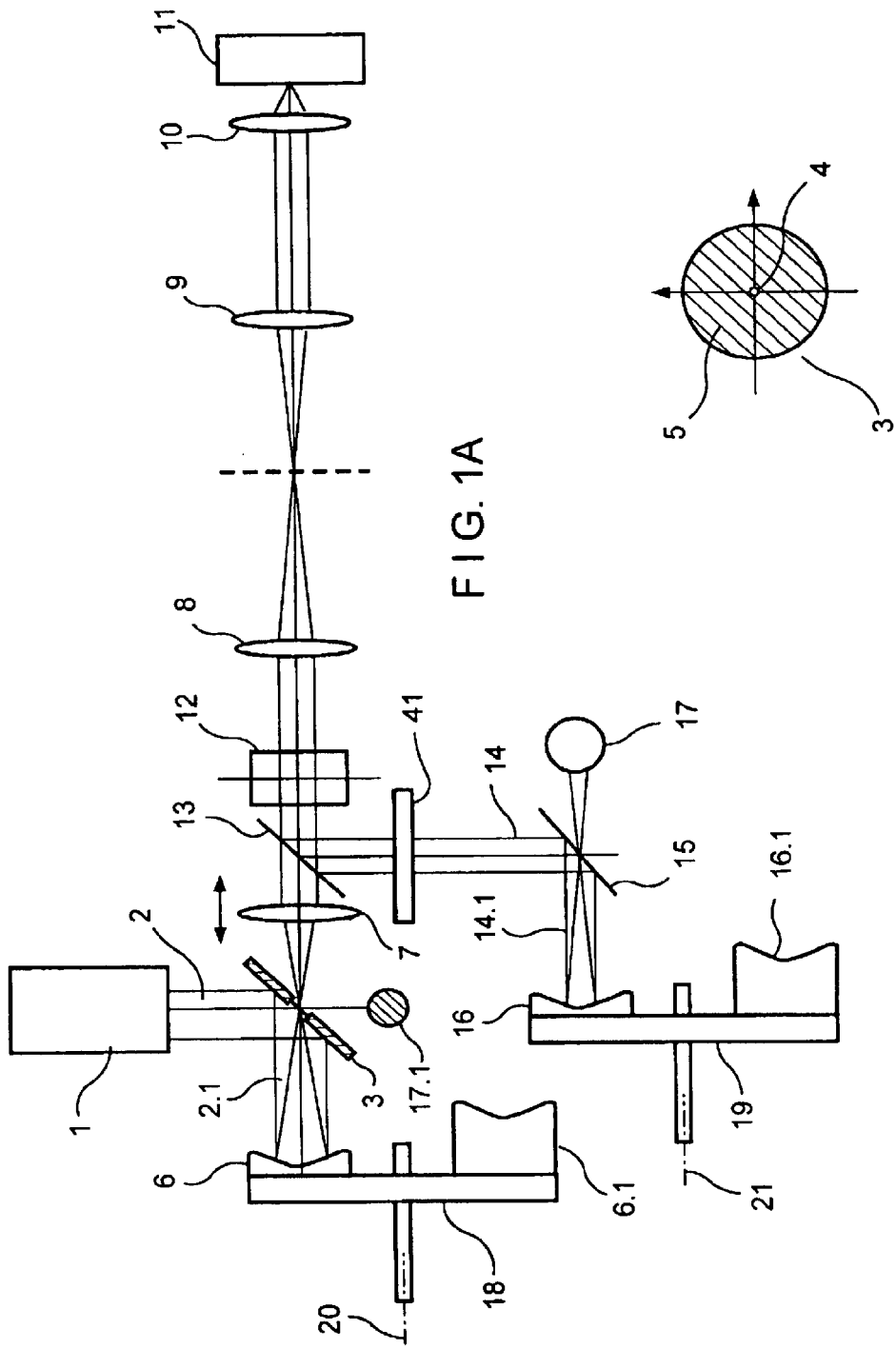

OPTICAL ARRANGEMENT FOR OBTAINING INFORMATION FROM A SAMPLE OR AN OBSERVED OBJECT

CROSS-REFERENCE TO RELATED APPLICATION

This application claims priority of German Application No. 102 27 119.4, filed Jun. 15, 2002, the complete disclosure of which is hereby incorporated by reference.

BACKGROUND OF THE INVENTION a) Field of the Invention

The invention is directed to an optical arrangement for obtaining information from a sample or an observed object, with a light source for illuminating the sample or observed object and with a reception device for the light proceeding from the sample or observed object.

b) Description of the Related Art

In optical observation devices such as microscopes it is always necessary to influence the illumination beam path or observation beam path in such a way that optical imaging characteristics are achieved. This applies, for instance, to varying the beam path cross section in the illumination beam path for purposes of optimizing the optical resolution, achieving a high transmission efficiency in the objective, adapting to the objective pupil and correcting the focus volume. Further, it is desirable to be able to vary the imaging scale in the illumination beam path in order to influence the length of an illumination line or change the imaging scale in the observation beam path.

The variable optics known from the prior art for adapting a beam path to an objective are formed, for example, as simple telescopes or cylindrical optics and generally have reflecting and/or refractive optical elements.

Use of refractive optical elements such as those shown in the Figure labeled "Prior Art 1" requires a relatively large build space determined by the sum of the focal lengths of the individual lenses. Further, when using refractive optical elements, steps must be taken to correct chromatic errors if polychromatic light sources are employed; otherwise, the imaging characteristics are not identical for all wavelengths.

The disadvantages mentioned above can be overcome through the use of reflecting elements (shown, for example, in the Figure labeled "Prior Art 2"), but an arrangement of this kind results in imaging errors like astigmatism, for instance. Consequently, an arrangement of this kind limits the quality of the optical instrument in question or requires increased technical expenditure to improve the imaging characteristics through additional technical means.

SUMMARY OF THE INVENTION

The need to optimize image quality exists particularly with respect to laser scanning microscopy which has experienced a surge in development in recent years. The invention described in the following is preferably directed to this field. It is especially suited for application in confocal laser scanning microscopes, fluorescence correlation microscopes and laser scanning cytometers.

In arrangements of the type described above, it is the object of the invention to enable variable influencing of the illumination beam path or observation beam path for extensive optimization of the imaging characteristics.

According to the invention, in an optical arrangement of the type mentioned in the beginning, it is provided that there is at least one beam splitter having a splitter surface with a transmittive area and a reflective area, and the light is directed to the splitter surface, reflected by the reflective area of the splitter surface to a concave mirror, focused by the concave mirror onto the transmittive area and passes through the latter, or the light is focused onto the transmittive area, passes through the latter to a concave mirror, is directed from the concave mirror to the splitter surface and is deflected by the reflective area of the latter;

the focusing is influenced by the geometry of the mirror surface of the concave mirror and the distance between the concave mirror and splitter surface, a selected beam expansion is predetermined and/or the wavefront of the light is manipulated for purposes of achieving an optimum matching of the light to the characteristics of the rest of the optical component groups and/or to the optical characteristics of the sample or of the observation object.

In a construction of the optical arrangement as laser scanning microscope, for example:

there is a beam splitter in the illumination beam path which has a splitter surface with a transmittive area and a reflective area, wherein the illumination light is initially directed to the splitter surface, is reflected by its reflective area to a concave mirror, is focused by the concave mirror onto the transmittive area and passes through this transmittive area to the sample, and/or there is a beam splitter in the detection beam path that has a splitter surface with a transmittive area and a reflective area, wherein the detection light is initially directed onto the splitter surface, reflected by the reflective area of the latter to the concave mirror, focused by a concave mirror on the transmittive area and passes through the latter to a detection device.

The concave mirrors are advantageously positioned in a pupil plane of the illumination beam path and detection beam path. The beam splitters can be arranged in an intermediate image plane or pupil plane of the illumination beam path or detection beam path.

Further, adjusting devices are provided for varying the focal length of the concave mirror and/or for changing the distance between the respective beam splitter and the associated concave mirror.

By varying the focal length of the concave mirror, for example, a variable beam expansion can be carried out in a simple manner; by varying the focal length of the concave mirror and changing the distance between the beam splitter and concave mirror and by changing the focus distance, a beam expansion with correction of the focus position can also be carried out in a simple manner.

In a preferred construction of the invention, the detection device is connected to the adjusting devices via an evaluating device, and the evaluating device generates actuating signals which serve to vary the focal length of the concave mirror and/or to change the distance between the respective beam splitter and the associated concave mirror depending on the detector signal.

The information received by the detection device is converted into electronic actuating signals by the evaluating device by means of the beam intensity and is used for generating appropriate actuating variables, so that the efficiency of the arrangement is substantially increased possibly by varying the beam expansion or by varying the beam expansion with simultaneous correction of the focus position in that the transmission is adapted to the focus volume. If only the focus position is changed by the described apparatus, a focus scanning can also be carried out, for example.

In an analogous manner the concave mirror arranged in the detection beam path focuses the detection light on the beam splitter, so that the detection light in the area of the focus passes through the transmittive area and subsequently reaches the detection device. The transmittive area acts as a confocal diaphragm in the detection beam path.

By varying the focal length it is possible to adjust the size of the confocal diaphragm (pinhole side) or the spot size at the location on the sample and thus increase the resolution of the laser scanning microscope.

In a construction of the above-mentioned arrangement, according to the invention, a spherical concave mirror is provided in the illumination beam path and/or in the detection beam path and is arranged together with other spherical concave mirrors of different focal lengths on a change wheel communicating with the evaluating device, a spherical concave mirror of selected focal length being placed in the illumination beam path by rotating the change wheel by a rotational angle that is predetermined by the evaluating device.

Instead of a plurality of spherical concave mirrors arranged on the change wheel, an adaptive spherical concave mirror can also be provided which is outfitted with an adjustable mirror surface varying the focal length and communicates with the evaluating device, a selected focal length being adjusted by means of an actuating signal generated in the evaluating device.

When using adaptive optics, e.g., mirrors which adjustable focal lengths, the transmittive area of the beam splitter is not formed as a confocal diaphragm or spatial filter and is advantageously constructed as an opening with a diameter of at least 5 Airy rings.

On the other hand, when the transmittive area must act as a spatial filter, the diameter of the transmittive area must be adapted in a corresponding manner.

The splitter surface is inclined by 45° relative to the incident illumination light or detection light and it has in its center a circular or elliptical opening which forms the transmittive area and which is surrounded by the reflective area formed as mirror surface.

Accordingly, it is possible to vary the focal length either by rotating the change wheel in that spherical concave mirrors of different focal lengths are placed in the illumination beam path or detection beam path, or insofar as adaptive spherical concave mirrors are provided by influencing their focal length by controlling the adjusting elements that are connected to the mirror surface.

It is possible to vary the beam expansion and influence the wavefront in the respective beam path with the adaptive spherical concave mirrors in order to correct image errors which are caused by the specimen or the optical system of the arrangement.

When the transmittive area is formed as an elliptical opening, the 45-degree inclination of the splitter surface relative to the incident illumination light or detection light advantageously results in an apparently circular through-opening.

A detector can be arranged after every beam splitter in the direction of the illumination light or detection light that initially strikes its splitter surface in an unfocused manner for receiving the beam portion that is not directed from the reflective area to the concave mirror but which passes through the transmittive area. The signal obtained by the detector can advantageously be used to monitor the average output of the respective beam. The detector can be constructed as a monitor diode, for example.

The quantity of the coupled-out beam portion is given by the following equation:

$$T = \frac{A_{HT}}{A_{pupil}} = \frac{r_{HT}^2}{r_{pupil}^2}$$

where T is the transmission, $A_{HT}$ is the surface of the transmittive area, $A_{pupil}$ is the effective pupil cross section, $r_{HT}$ is the radius of the transmittive area and $r_{pupil}$ is the radius of the pupil, where advantageously T~1%.

Further, a lens or a lens system for collimating is advantageously provided in the beam path of the illumination light which passes through the transmittive region and which is directed to the sample, and scanning optics and a tube lens, followed by the objective, are further provided in the beam path in front of the sample. In this connection, a diffraction-limited spot is generated which is moved in lateral direction over the sample by the scanning device located in or in the vicinity of a pupil of the optical arrangement and the sample is scanned.

The light radiated from the sample passes through the objective, the tube lens, the scanning optics and the scanning device in the opposite direction as a detection beam path and is advantageously split from the illumination beam path by a dichroic beam splitter and arrives at the detection device via pinhole optics and a confocal diaphragm.

For fluorescence detection, a wavelength filter can be swiveled into the detection beam path in addition for suppressing the illumination light, so that the light received by the detection device is not affected by the illumination light.

In a preferred development of the invention, a spherical concave mirror is provided in the illumination beam path and/or in the detection beam path, which spherical concave mirror focuses the illumination light in a punctiform manner on the splitter surface, where it passes through the transmittive area formed as a circular or elliptical opening and the splitter surface is followed in the direction of light flow by another spherical concave mirror upon which the traversing illumination light impinges and which reflects this illumination light in a collimated manner back to the splitter surface, where it is deflected in the direction of the sample or detection device by the reflecting rear side of the splitter surface.

The ratio of the surface of the transmittive area to the surface of the reflective area should satisfy the following function:

$$R = \frac{A_{pupil} - A_{HT}}{A_{pupil}} = \frac{r_{pupil}^2 - r_{HT}^2}{r_{pupil}^2}$$

where R should be greater than 99%. In this case, $A_{pupil}$ is the effective pupil cross section, $A_{HT}$ is the surface of the transmittive area, $r_{pupil}$ is the pupil radius and $r_{HT}$ is the radius of the transmittive area.

In another preferred development of the arrangement according to the invention, a cylindrical concave mirror which focuses the illumination light on the splitter surface so as to be expanded in line-shaped manner in x-direction is provided in the illumination beam path and/or detection beam path. Further, there is a splitter surface with a slit-shaped opening that is likewise expanded in x-direction and forms the transmittive area, the illumination light passing through this opening, and the splitter surface is followed in the direction of light flow by a spherical concave mirror, the illumination light which is expanded in a line-shaped manner being reflected back by this spherical concave mirror so as to be rotated by 90° in the y-direction, where it is deflected toward the sample or toward the detection device by the reflecting rear side of the splitter surface. The ratio of the surface of the transmittive area to the surface of the reflective area should satisfy the following condition:

$$R = \frac{A_{pupil} - A_{HT}}{A_{pupil}} = \frac{\pi \cdot r_{pupil} - 2b_{HT}}{\pi \cdot r_{pupil}}$$

where R should be about 97% and, again, $A_{pupil}$ is the effective pupil surface, $A_{HT}$ is the surface of the transmittive area, $r_{pupil}$ is the pupil radius and, finally, $b_{HT}$ is the width of the transmittive area. For example, the width of the transmittive area should be less than 0.25 mm.

Further, in a variation of the construction mentioned above, a spherical concave mirror which focuses the illumination light on the splitter surface in a punctiform manner can be provided in the illumination beam path and/or detection beam path, the splitter surface being inclined by 45° to the incident illumination light and having in its center a circular or elliptical opening which forms the transmittive area and through which the illumination light passes, and the splitter surface is followed in the direction of light flow by a cylindrical concave mirror which reflects the illumination light in line-shaped manner back to the splitter surface, where it is deflected toward the sample or toward the detection device by a reflecting rear side of the splitter surface.

Analogous to the beam expansion with spherical concave mirrors, the length of the scan line can be adapted with the cylindrical concave mirror arranged in the illumination beam path in that the focal length of the cylindrical concave mirror is changed and/or its distance from the beam splitter is varied.

In further developments of the two preferred constructional variants shown above, there are a plurality of concave mirrors located opposite one another in pairs on both sides of the splitter surface, wherein the focal lengths vary from one pair of concave mirrors to another, each pair of concave mirrors has a common optical axis, the optical axes of the pairs lie together in an xy plane and are arranged so as to be rotated relative to one another around the z-axis. Further, the splitter surface is supported so as to be rotatable around the z-axis and is coupled with a drive communicating with the evaluating unit, the splitter surface being oriented vertical to the optical axis of a selected pair of concave mirrors after being rotated by a rotational angle that is predetermined by the evaluating device.

Every pair of concave mirrors forms a telescope with a predetermined magnification. When the splitter surface is oriented vertical to the optical axis of a selected pair of concave mirrors, the magnification predetermined by this pair is effective and expands the beam cross section in a corresponding manner. When the splitter surface is rotated and oriented to a next pair of concave mirrors, the magnification changes in a corresponding manner.

The more pairs of concave mirrors that can be realized by rotating the splitter surface, the more variable the magnification and, therefore, the greater the possibility of changing the beam cross section. The switching position during the rotation of the splitter surface is adapted to the respective angular distances between the pairs of concave mirrors.

By combining spherical and cylindrical concave mirrors in pairs of concave mirrors in the manner already described above, it is also possible to switch form the "point scanning" operating mode to the "line scanning" operating mode in one and the same microscope arrangement in that a splitter surface with a circular or elliptical opening is mounted so as to be rotatable and is adjusted by rotating selectively between pairs of concave mirrors in spherical/spherical combination for point scanning or cylindrical/spherical combination for line scanning or spherical/cylindrical combination also for line scanning.

According to the invention, one or both concave mirrors within every pair can be formed as adaptive concave mirror and can communicate with the evaluating device, wherein a change in focal length is caused by an adjustment generated by the evaluating device.

A similar effect is achieved in that one or both concave mirrors of a pair of concave mirrors of the type described above is or are arranged so as to be displaceable in direction of the optical axis. The beam path can accordingly be selectively focused or defocused.

In this optical arrangement, the light always travels vertical to the surface of the concave mirror. In this way, it is ensured that no imaging errors are generated.

If required, this optical device can also be entirely eliminated from the beam path in that the splitter surface is rotated such that its normal lies in none of the optical axes of the pairs of concave mirrors.

In another further development of the arrangement according to the invention, relay optics which are used for generating a pupil at the location of one of the concave mirrors are arranged following the splitter surface in the illumination beam path.

Also, in the constructions mentioned above a wavelength filter which can be swiveled into the detection beam path can be provided for suppressing the illumination light in fluorescence detection.

Further, refractive optical elements which cause a shortening of the focal length of the respective concave mirror can be associated with one or more of the concave mirrors. These refractive optical elements can be, for example, lenses, imaging mirrors or the like.

The invention also includes arrangements in which the positions of the transmittive and reflective areas on the splitter surface are interchangeable, i.e., the transmittive area as well as the reflective area can be located either in the center of the splitter surface or at its periphery.

Further, the pupil plane is advantageously identical to the reflector surface of the scanning device of the microscope. The arrangement of a dichroic beam splitter by which the detection light coming from the sample is branched off from the illumination beam path in all of the described construction variants is advantageous.

Information about beam intensity is at the outputs of the detection devices. This information is compared in the evaluating device to information stored there, and actuating signals are generated from the determined difference, which actuating signals can be used for changing the focal length of the adaptive mirrors, the rotation of the change wheels or for changing the distances between a respective concave mirror and the associated splitter surface.

With respect to line scanning, a line-shaped detector can be provided in the detection device; the orientation of the detector line should coincide with the orientation of the scan line guided over the sample.

The invention will be described more fully in the following with reference to embodiment examples.

BRIEF DESCRIPTION OF THE DRAWINGS

In the drawings:

FIG. 3b shows a splitter surface for variable optics according to FIG. 3a;

FIG. 4b shows a splitter surface for variable optics according to FIG. 4a; and

DESCRIPTION OF THE PREFERRED EMBODIMENTS

Figure 1:
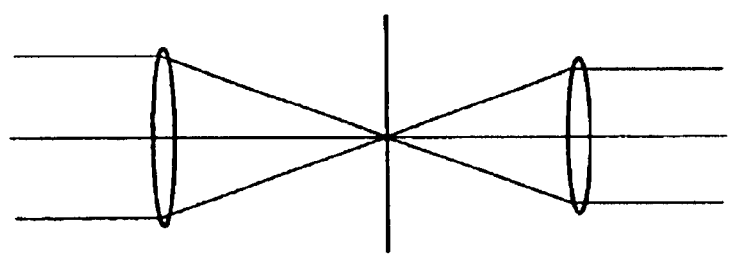
FIGS. 1a and 1b are schematic views of a first embodiment example with variable optics in the illumination beam path and observation beam path of a point-scanning confocal laser scanning microscope.

According to FIG. 1, the illumination light 2 emitted by a light source 1 impinges on the splitter surface 3 of an optical beam splitter.

It can be seen from FIG. 1b that the splitter surface 3 has a transmittive area 4 which is formed as an opening and which is surrounded by a reflective area 5. The transmittive area 3 is formed, for example, as a circular or elliptical opening, and the reflective area 5 is formed as a mirror surface.

Further, as is shown in FIG. 1a, the splitter surface 3 is inclined by 45° relative to the incident illumination light 2. Accordingly, a portion 2.1 of the illumination light is deflected by the reflective area 5 in the direction of a spherical concave mirror 6 which is located in a pupil plane of the optical arrangement shown in the drawing.

The spherical concave mirror 6 focuses the beam portion 2.1 in itself back to the transmittive area 4 which is positioned in an intermediate image plane and accordingly acts as a confocal diaphragm in the illumination beam path. The optical resolution of the arrangement can be influenced or predetermined by the diameter of the transmittive area 4.

When the transmittive area 4 has an elliptical shape, it assumes an apparent circular shape because of the 45-degree inclination in the projection direction of the radiation coming from the concave mirror 6.

The illumination light which is focused through the transmittive area 4 is subsequently collimated by a lens 7. Scanning optics 8, a tube lens 9 and the microscope objective 10 generate a spot in the sample 11, this spot being moved in lateral direction by means of the scanning device 12 for purposes of a point scanning of the sample 11.

The detection light which is radiated from the sample 11 and carries the image information passes on its return path through the microscope objective 10, tube lens 9, scanning optics 8 and scanning device 12 to a dichroic beam splitter 13 which couples the detection beam path 14 out of the illumination beam path and directs it to the splitter surface 15 of another beam splitter.

Splitter surface 15 is constructed identical to splitter surface 3 with respect to geometry (see FIG. 1b) and is likewise arranged at a 45-degree inclination.

A predominant proportion of radiation 14.1 is deflected at the reflective area 5 in the direction of a spherical concave mirror 16. The concave mirror 16 focuses the beam portion 14.1 in itself back through the transmittive area 4 of the splitter surface 15, whereupon this beam portion 14.1 of the detection light strikes a detector 17.

The intensity of the detection light is measured by means of the detector 17 and corresponding information is conveyed to an evaluating device which is not shown in the drawing.

The evaluating device communicates with drives for change wheels 18 and 19 upon which, in addition to spherical concave mirrors 6 and 16, additional spherical concave mirrors are located in a quantity which can vary depending on the construction of the arrangement according to the invention. For the sake of clarity, only concave mirror 6.1 and concave mirror 16.1 are shown.

Depending on the output signal of the detector 17, actuating signals are generated in the evaluating device which cause the change wheels 18 and/or 19 to be rotated by predetermined rotational angles by means of the respective drives, so that concave mirrors of different focal lengths are placed in the beam portion 2.1 of the illumination light or in the beam portion 14.1 of the detection light.

In this way, there is an automatic selection of a concave mirror that focuses the respective beam portion 2.1 or 14.1 in the transmittive area 4 of the splitter surfaces 3 or 15 in an optimal manner based on its focal length.

This makes it possible to adapt the illumination of the objective pupil and, accordingly, to achieve the transmission efficiency in the objective, the optical resolution (e.g., through over-radiation of the objective pupil) or, in special cases, to deliberately worsen the optical resolution by underfilling the objective pupil.

In a special construction, a detector 17.1, for example, a monitor diode, is arranged after the splitter surface 3 in the direction of the incident illumination light 2 and serves to monitor the average output of the illumination light. The quantity of coupled-out light is given by the function for T which was already mentioned above.

As an alternative to arranging a plurality of concave mirrors 6,6.1 on a change wheel 18 that is swivelable around the rotational axis 20 in the illumination beam path or a plurality of concave mirrors 6,6.1 on a change wheel 19 that is swivelable around the rotational axis 21 in the detection beam path, it is possible to provide only one adaptive spherical concave mirror whose focal length is variable.

In this way, it is possible to manipulate the wavefront in the respective beam path and to use this for correcting image errors which are caused by the optical components of the arrangement or by the sample 11 being examined. For this purpose, actuating signals for changing the geometry of the concave mirror surface are generated in the evaluating device depending on the detection signals.

Figure 2:
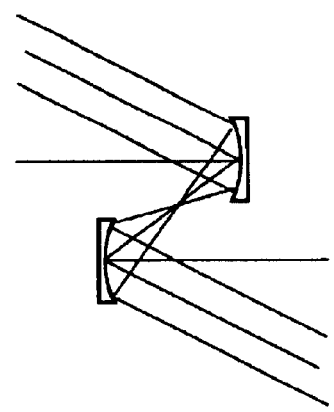
FIGS. 2a and 2b are schematic views of a second embodiment example with variable optics only in the illumination beam path of a point-scanning confocal laser scanning microscope.
Figures 2A, 2B:
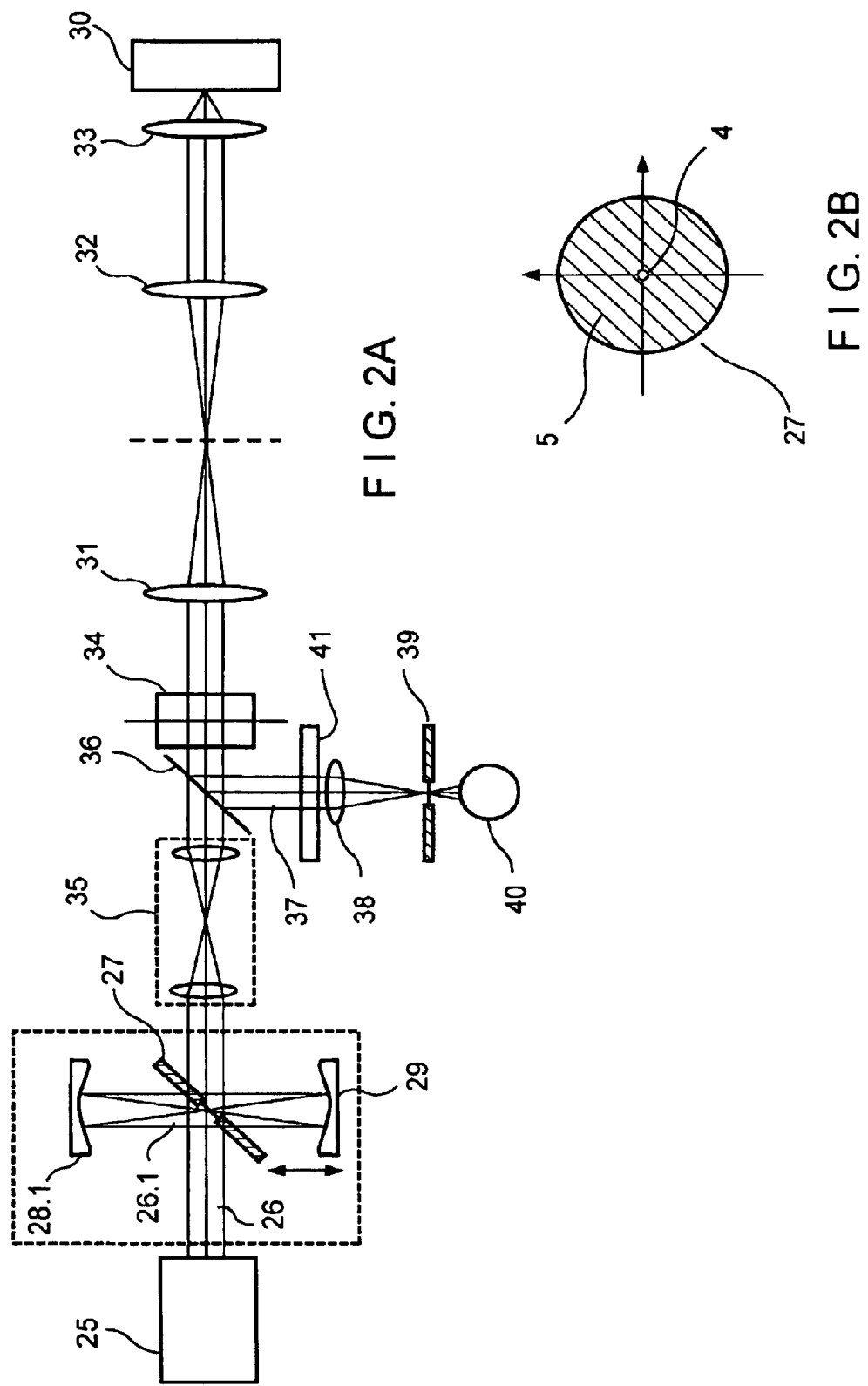

FIG. 2a shows an embodiment example of the arrangement according to the invention in which variable optics are provided only in the illumination beam path. In this case, the collimated illumination light 26 coming from a light source 25 is initially directed to the splitter surface 27 of a beam splitter which (as was already shown in the preceding embodiment example and again in FIG. 2b) has a transmittive area 4 and a reflective area 5.

The splitter surface 27 is inclined by 45° relative to the incident illumination light 26, so that a beam portion 26.1 is directed from the reflective area 5 initially to a concave mirror 28 and is focused by the mirror surface of the latter in itself back to the transmittive area 4 of the splitter surface 27.

According to the invention, the light that is focused through the transmittive area 4 to a subsequently arranged spherical concave mirror 29 is located in a pupil plane of the illumination beam path. The concave mirror 29 and the splitter surface 27 are arranged relative to one another in such a way that the transmittive area 4 is located in the focal point of the concave mirror 29. Further, the transmittive area 4 is positioned in an intermediate image plane of the microscope arrangement, so that the transmittive area 4 can act as a confocal diaphragm in the illumination beam path.

In this case also, the transmittive area 4 is formed as a circular, but preferably elliptical, opening.

The concave mirror 29 reflects the beam portion 26.1 in collimated form back to the splitter surface 27 which is also reflective on its back side, i.e., where collimated illumination light coming from the concave mirror 29 impinges, so that the beam portion 26.1 is now deflected in the direction of a sample 30.

In this connection also, a diffraction-limited spot which is moved in lateral direction over the sample 30 by means of a scanning device 34 is generated by scanning optics 31, a tube lens 32 and microscope objective 33. The scanning device 34 is located in or in the vicinity of a pupil of the microscope arrangement.

Relay optics 35 are advantageously placed in the beam path and serve to generate a pupil at the location of the concave mirror 29.

The light radiated from the sample passes on its return path through the microscope objective 33, tube lens 32, scanning optics 31 and scanning device 34 to a dichroic beam splitter 36 which couples out a detection beam path 37. The detection beam path 37 subsequently passes through pinhole optics 38 and a confocal diaphragm 39 to a detector 40.

An insertable wavelength filter 41 is provided optionally and serves, e.g., in fluorescence detection, suppress portions of the illumination light.

In this embodiment example, the output signal of the detector 40 is also applied to an evaluating device, not shown, which serves to evaluate the intensity of the detection light and generates actuating signals from the latter which are used for correcting the focal distance of concave mirror 28 and/or concave mirror 29.

Adjusting devices, not shown, can be constructed in such a way that either the distances between the concave mirrors 28, 29 and transmittive area 4 are changed by an amount corresponding to an actuating variable obtained from the detection signal or the concave mirror 28 and/or concave mirror 29 are formed as adaptive mirrors in which the curvature of the concave mirror surface can be changed by adjusting elements so that the focus point is varied by changing the geometry of the concave mirror surface.

The portion of illumination light impinging on the reflective area 5 is lost at the splitter surface 27 in case of defocusing. However, as was already described, the ratio of the surface of the transmittive area to the surface of the reflective area R is greater than 99%, which denotes an efficient beam splitting. This efficiency is not dependent upon the wavelength that is used. The radius for the reflective area is about 5 mm and the transmittive area has a radius of less than 0.25 mm.

When an adaptive mirror is used as concave mirror 28 image errors, e.g., aberrations, can be corrected by readjusting the mirror surface.

Insofar as spatial filtering is provided after the beam splitting by the splitter surface 27, there is an increase in the efficiency of the spatial filtering due to the correction of the errors of the light source.

Of course, it is possible to use adjusting devices for varying the focus distance as well as adaptive mirrors and to use both adjusting possibilities in conjunction with one another.

The two concave mirrors 28, 29 cooperate to form a telescope with which the beam expansion can be varied. In this way, it is possible to adapt the illumination of the objective pupil and thus to achieve the transmission efficiency in the objective, the optical resolution (e.g., through over-radiation of the objective pupil) or, in special cases, to deliberately worsen the optical resolution by underfilling the objective pupil.

The illumination beam path can easily be focused or defocused in the objective pupil by displacing, for example, the concave mirror 29 along its optical axis. The axial position of the focus in the sample 30 can accordingly be varied (focus scanning).

When an adaptive mirror is used as concave mirror 29, a correction of the image errors caused in the illumination beam path by the optical component groups or the sample 30 being examined is achieved along with the adaptation of the mirror surface.

It lies within the framework of the invention to replace the concave mirror 28 by a transmittive element, e.g., a lens, which focuses the illumination light in the transmittive area 4 of the splitter surface 27. This transmittive element must then be positioned between the illumination source 25 and the splitter surface 27.

Figure 3A:
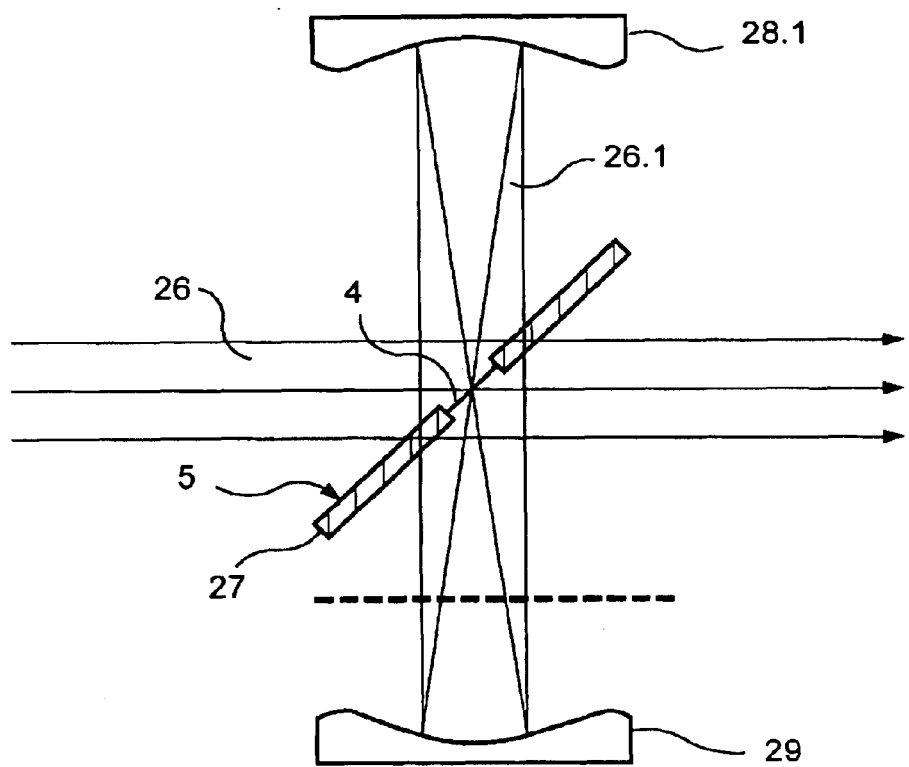
FIG. 3a shows variable optics formed from two spherical concave mirrors for the embodiment example according to FIGS. 2a and 2b.

FIG. 3a is a detailed view of the telescope formed from the concave mirrors 28 and 29. The drawing shows the illumination beam path 26 which impinges on the splitter surface 27 and is directed from the reflective area 5 of the latter to a predominant beam portion 26.1 on the concave mirror 28. The illumination light is reflected by the concave mirror 28 back to the transmittive area 4, passes through the latter to the concave mirror 29, is reflected back again in itself by the mirror surface of the concave mirror 29, strikes the reflecting rear side of the splitter surface 27 and is deflected by the latter in the direction of the sample 30 (see FIG. 2).

Figure 3B:
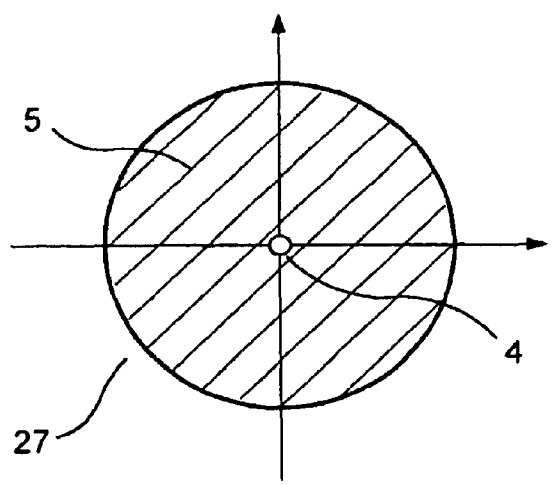

In this case, the concave mirrors 28 are constructed as spherical concave mirrors and the transmittive area 4 is formed as a circular opening (see FIG. 3b) by means of which a spot can be generated and a point-scanning device can be operated.

Figure 4A:
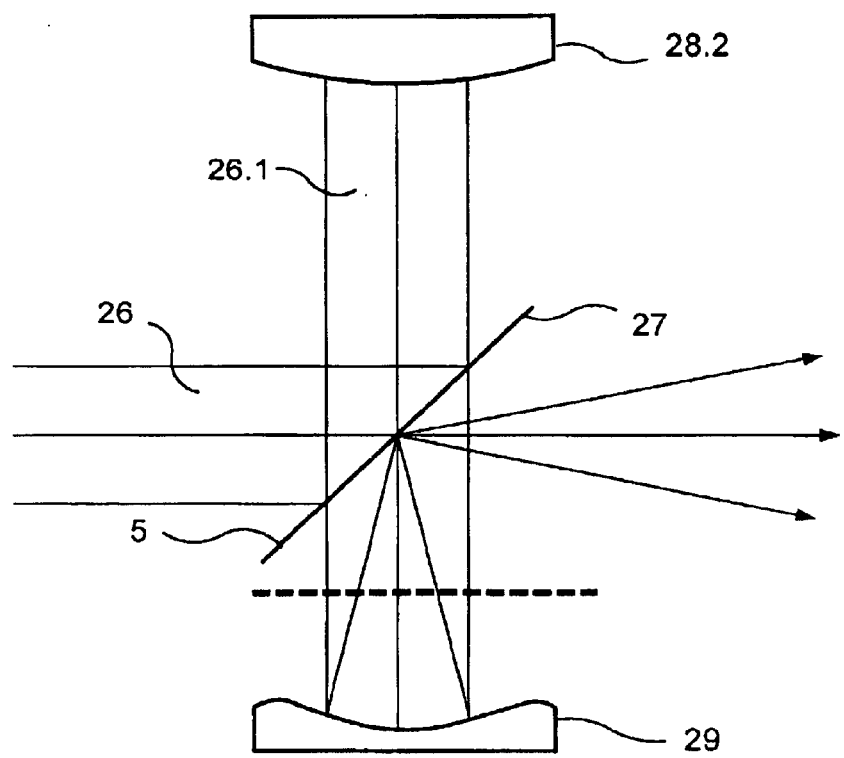
FIG. 4a shows variable optics formed from a cylindrical concave mirror and a spherical concave mirror for the embodiment example according to FIG. 2.
Figure 4B:
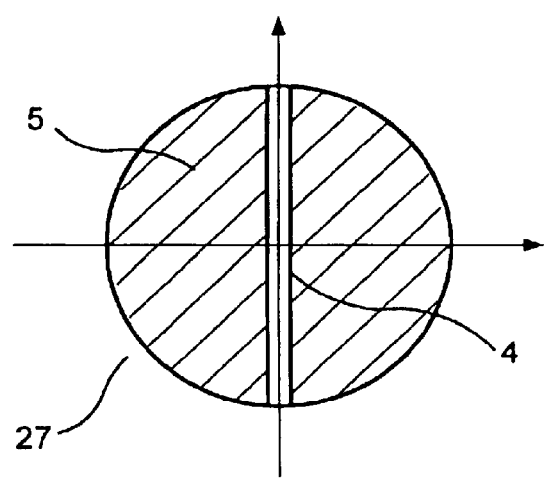

In an alternative constructional variant which is shown in FIG. 4a and FIG. 4b, a cylindrical concave mirror can be provided as concave mirror 28 and the transmittive area 4 can be formed as a slit-shaped opening. This arrangement serves for shaping a line-shaped illumination for scanning the sample 30.

As can be seen from FIG. 4a, the illumination light 26 reaches the reflective area 5 of the splitter surface 27 again and is deflected from the latter in the direction of the concave mirror 28 which is cylindrical in this case and which reflects the beam portion 26.1 of the illumination light back onto the splitter surface 27 in only one coordinate in a focused manner. In this connection, the slit-shaped transmittive area 4 shown in FIG. 4b and the coordinate in which the illumination light is directed onto the splitter surface 27 are identically directed, so that the illumination light is focused through the slit-shaped transmittive area 4 and strikes, the spherical concave mirror 29 arranged after it.

The spherical concave mirror 29 reflects the illumination light in itself, and the illumination light which is bundled in line-shaped manner strikes the reflecting rear side of the splitter surface 27 at a 90-degree rotation and is deflected by the latter in the direction of the sample 30. Only the portion of the illumination beam striking the transmittive area is lost in this case.

The pupil radius for the reflective area is about 5 mm and the transmittive area has a width of $b_{HT}$<0.25 mm. The function described above gives the ratio of the two surfaces R=97% and therefore also the wavelength-independent efficiency of the beam splitting at the splitter surface 27.

Figure 6:
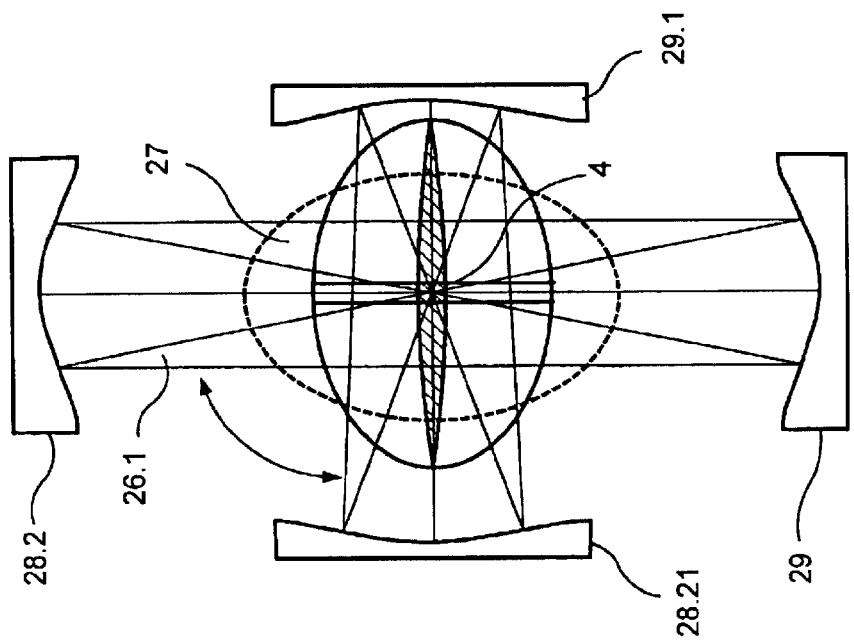
FIG. 5 and FIG. 6 show the guiding of the beam in embodiment examples with a plurality of pairs of concave mirrors.
Figure 5:
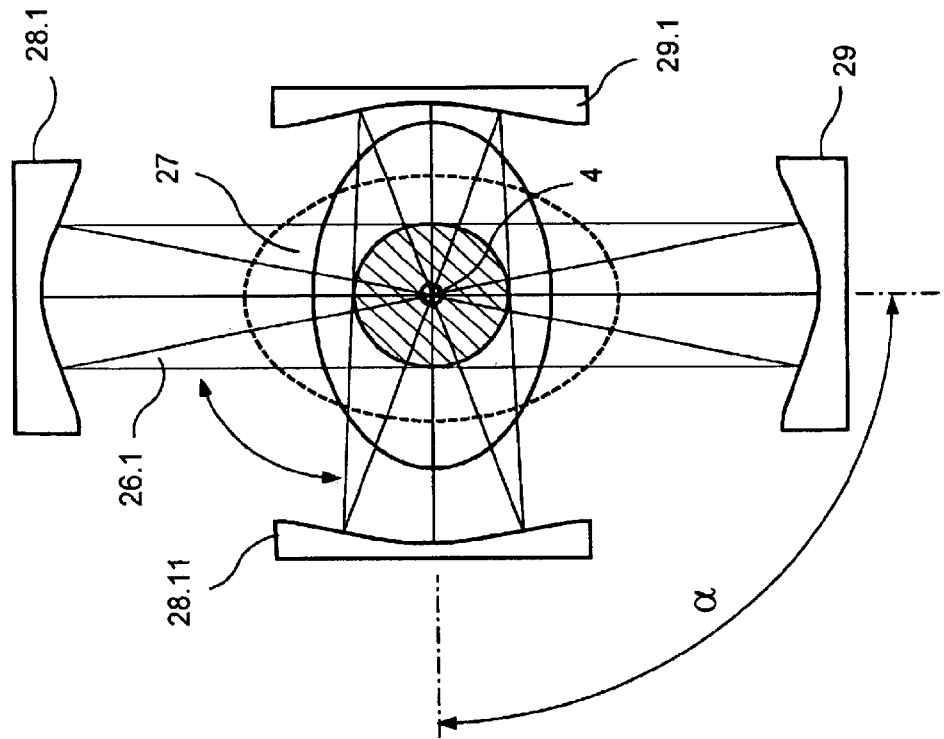

Further possible constructions of the second embodiment example are shown in FIG. 5 and FIG. 6. FIG. 5 relates to the generation of a diffraction-limited spot for point scanning and FIG. 6 relates to the generation of line-shaped illumination for line scanning of the sample 30.

FIG. 5 shows the pair of concave mirrors 28, 29 and the splitter surface 27 from FIG. 4a viewed in the direction of the illumination light 26 impinging on the splitter surface 27. The splitter surface 27 appears to have an elliptical outline from this perspective because of its 45-degree inclination. The transmittive area 4 which is formed as an opening with elliptical outline appears from this perspective as a circular opening.

As can further be seen from FIG. 5, two additional concave mirrors 28.1 and 29.1 are provided which are located opposite one another in a manner analogous to the concave mirrors 28, 29 with respect to the optical axis of the illumination light 26. Both pairs of concave mirrors 28/29 and 28.1/29.1 are rotated by an angle $\alpha$=90° around the optical axis. The focal length of the concave mirror 28.1 deviates from the focal length of concave mirror 28, and the focal length of concave mirror 29.1 deviates from the focal length of the concave mirror 29, which is demonstrated by the different spacing between the individual concave mirrors and the optical axis.

Further, the splitter surface 27 is coupled with a device, not shown, for rotation about the optical axis. When the splitter surface 27 is rotated into a position such as that shown by the dotted line, the illumination light 26 striking the reflective area 5 is deflected toward the spherical concave mirror 28.1 as was already described with reference to FIG. 2a and FIG. 3a, is focused by the latter through the transmittive area 4, strikes the concave mirror 29 after passing through the transmittive area 4, is reflected by the concave mirror 29 back in the direction of the splitter surface 27 again in a collimated manner, and is deflected by the reflective rear side of the splitter surface 27 toward the sample (into the drawing plane).

In this rotational position of the splitter surface 27, the two concave mirrors 28.1, 29 act together as a telescope by which the beam cross section is influenced, either by changing the focal length in one or both of the concave mirrors 28.1, 29, insofar as they are formed as adaptive mirrors, or by changing their distances to the transmittive area 4.

When the splitter surface 27 is rotated by 90°, the illumination light 26 still strikes the reflective area 5 of the splitter surface 27, but is now directed to concave mirror 28.11 instead of to concave mirror 28.1 and is focused by the former through the transmittive area 4, strikes the concave mirror 29.1, is thrown back by the latter in collimated manner to the reflective back side of the splitter surface 27 and is deflected in the direction of the sample 30 (into the drawing plane).

Due to the different focal lengths of the pair of concave mirrors 28.1/29 and 28.11/29.1, different telescopic actions or beam expansions are achieved depending on the rotational position of the splitter surface 27. In this respect, there is a broader range of possibilities for adapting the beam cross section because, in addition to the pair of concave mirrors 28/1/29, the pair of concave mirrors 28.11/29.1 (after rotation of the splitter surface 27) is also available for influencing the beam cross section.

Of course, this construction of the invention is not limited to the two concave mirror pairs 28/29 and 28.11/29.1 shown herein. Other pairs of concave mirrors can be provided; for example, four pairs would result in a rotational angle for the splitter surface 27 of 45° in order to align the reflection direction to one of the four concave mirror pairs.

FIG. 6 shows the same arrangement in an analogous sense, but with a slit-shaped transmittive area 4 for generating a line-shaped illumination on the sample 30. The function corresponds by analogy to that described above.

With the arrangement according to the invention it is advantageous and possible in a simple manner to adapt the beam cross section in the illumination beam path to the objective pupil and accordingly to optimize the optical resolution of the entire arrangement. In the same way, the transmission efficiency in the objective can be optimized by adapting the beam cross section in the illumination beam path. It is also possible to change the beam cross section in the illumination beam path with the aim of adapting the focusing volume.

In a line-scanning microscope, for example, the length of the illumination line can be adapted with an arrangement of the type mentioned above by varying the imaging scale in the illumination beam path. Further, it is possible to adjust the optical section thickness by changing the imaging scale in the observation beam path.

Accordingly, there are many possibilities for adapting or optimizing which result in improved optical characteristics of the optical observation device in question.

The invention was explained in the preceding with reference to embodiment examples in which detector signals are used to generate actuating signals for adjusting devices in order to automatically influence the beam expansion and focus position. Of course, it is also conceivable for alternative constructions to omit the evaluating device, adjusting devices and, therefore, the automatic regulation and, instead of this, to place concave mirrors of different focal lengths in the beam path, for example, by manual rotation of the change wheels, or to change the focus distances by manual displacement of the concave mirrors or beam splitters in such a way that similar results are achieved.

While the foregoing description and drawings represent the present invention, it will be obvious to those skilled in the art that various changes may be made therein without departing from the true spirit and scope of the present invention.

Reference Numbers

| Reference Numbers | |
|---|---|
| 1 | light source |
| 2 | illumination light |
| 2.1 | beam portion |
| 3 | splitter surface |
| 4 | transmittive area |
| 5 | reflective area |
| 6, 6.1 | concave mirrors |
| 7 | lens |
| 8 | scanning optics |
| 9 | tube lens |
| 10 | microscope objective |
| 11 | sample |
| 12 | scanning device |
| 13 | beam splitter |
| 14 | detection beam path |
| 14.1 | beam portion |
| 15 | splitter surface |
| 16, 16.1 | concave mirrors |
| 17 | detection device |
| 18, 19 | change wheels |
| 20 | detector |
| 25 | light source |
| 26 | illumination light |
| 26.1 | beam portion |
| 27 | splitter surface |
| 28, 29 | concave mirrors |
| 28.1, 29.1 | concave mirrors |
| 28.11, 28.21 | concave mirrors |
| 30 | sample |
| 31 | scanning optics |
| 32 | tube lens |
| 33 | microscope objective |
| 34 | scanning device |
| 35 | relay optics |
| 36 | beam splitter |
| 37 | detection beam path |
| 38 | pinhole optics |
| 39 | diaphragm |
| 40 | detection device |
| 41 | filter |

What is claimed is:

1. An optical arrangement for obtaining information from a sample or an observed object, comprising:

a light source for illuminating the sample or observed object;

reception device for the light proceeding from the sample or observed object;

at least one beam splitter having a splitter surface with a transmittive area and a reflective area;

light from said source being directed to the splitter surface, reflected by the reflective area of the splitter surface to a concave mirror, focused by the concave mirror onto the transmittive area and passing through the latter; or the light being focused onto the transmittive area, passing through the latter to a concave mirror, being directed from the concave mirror to the splitter surface and being deflected by the reflective area of the latter;

the focusing being influenced by the geometry of the mirror surface of the concave mirror and distance between the concave mirror and splitter surface;

a selected beam expansion being predetermined, or the wavefront of the light being manipulated for purposes of optimally adapting the light:

to the characteristics of the rest of the optical component groups; or to the optical characteristics of the sample; or to the optical characteristics of the observed object; or any combination thereof;

wherein the concave mirror includes a spherical concave mirror provided in the illumination beam path or in the detection beam path or both, which spherical concave mirror focuses the illumination light in a punctiform manner on the splitter surface, wherein the splitter surface is inclined by 450° relative to the incident illumination light and has in its center a circular or elliptical opening which forms the transmittive area and through which the illumination light passes, and the splitter surface is followed in the direction of light flow by another spherical concave mirror which reflects the illumination light in a collimated manner back to the splitter surface, where it is deflected in the direction of the sample or detection device by the reflecting rear side of the splitter surface.

2. The optical arrangement according to claim 1, constructed as a laser scanning microscope, wherein the at least one beam splitter includes one or both of the following:

a beam splitter in the illumination beam path which has a splitter surface with a transmittive area and a reflective area, wherein the illumination light is initially directed to the splitter surface, is reflected by its reflective area to the concave mirror, is focused by the concave mirror onto the transmittive area and passes through this transmittive area to the sample, and a beam splitter in the detection beam path that has a splitter surface with a transmittive area and a reflective area, wherein the detection light is initially directed onto the splitter surface, reflected by the reflective area of the latter to the concave mirror, focused by the concave mirror on the transmittive area and passes through the latter to a detection device.

3. The optical arrangement according to claim 2, wherein the concave mirrors are positioned in a pupil plane of the illumination beam path and detection beam path.

4. The optical arrangement according to claim 1, wherein the beam splitters are positioned in an intermediate image plane or pupil plane of the illumination beam path or detection beam path.

5. The optical arrangement according to claim 1, wherein adjusting devices are provided for varying the focal length of the concave mirror or for changing the distance between the respective beam splitter and the associated concave mirror, or both.

6. The optical arrangement according to claim 5, wherein the adjusting devices are connected to the detection device via an evaluating device, and the evaluating device generates actuating signals depending on the detector signal, which actuating signals serve to vary the focal length of the concave mirror or to change the distance between the respective beam splitter and the associated concave, or both.

7. The optical arrangement according to claim 6, wherein there are additional concave mirrors located opposite one another in pairs on both sides of the splitter surface, wherein the focal lengths vary from one pair of concave mirrors to another, each pair has a common optical axis, the optical axes of the pairs lie together in the XY-plane and are arranged so as to be rotated relative to one another around the z-axis by an angle α, and the splitter surface is supported so as to be rotatable around the z-axis and is coupled with a drive communicating with the evaluating unit, wherein the splitter surface is oriented vertical to the optical axis of a selected pair of concave mirrors, after being rotated by angle α.

8. The optical arrangement according to claim 6, wherein one or more of the concave mirrors is/are formed with a mirror surface which is adjustable and accordingly varies the focal length and communicate(s) with the evaluating device, wherein a change in focal length is caused by an adjustment generated by the evaluating device.

9. The optical arrangement according to claim 1, wherein the spherical concave mirror is provided in the illumination beam path or in the detection beam paths, or both and is arranged together with other spherical concave mirrors of different focal lengths on a change wheel, a spherical concave mirror of selected focal length being placed in the illumination beam path or detection beam path by rotating the change wheel, or is formed with an adjustable mirror surface varying the focal length, wherein a selected focal length is predetermined by the adjustment.

10. The optical arrangement according to claim 9, wherein the splitter surface is inclined by 45° relative to the incident illumination light or detection light and has in its center a circular, preferably elliptical, opening which forms the transmittive area and which acts as a spatial filter for the illumination beam path or detection beam path.

11. The optical arrangement according to claim 1, wherein a detector is provided for receiving the beam portion passing through the transmittive area rather than the beam portion directed to the concave mirror from the reflective area.

12. The optical arrangement according to claim 1, wherein an optical device for collimating is arranged after the beam splitter in the illumination beam path.

13. The optical arrangement according to claim 12, wherein an optical device for collimating is a lens or a lens system.

14. The optical arrangement according to claim 1, wherein the ratio of the surface of the transmittive area to the surface of the reflective area satisfies the following condition:

$$R = \frac{A_{pupil} - A_{HT}}{A_{pupil}} = \frac{r^2_{pupil} - r^2_{HT}}{r^2_{pupil}}$$

where $A_{pupil}$ is the effective pupil cross section, $A_{HT}$ is the surface of the transmittive area, $r_{pupil}$ is the pupil radius and $r_{HT}$ is the radius of the transmittive area, where R is greater than 99%, the radius for the reflective area is about 5 mm, and the radius for the transmittive area is less than 0.25 mm.

15. The optical arrangement according to claim 1, wherein relay optics which are used for generating a pupil at the location of one of the concave mirrors are arranged following the splitter surface.

16. The optical arrangement according to claim 1, wherein a wavelength filter which can be swiveled into and out of the detection beam path is provided for suppressing the illumination light in fluorescence detection.

17. The optical arrangement according to claim 1, wherein refractive optical elements which serve to reduce the focal length of the respective concave mirror are associated with one or more of the concave mirrors.

18. The optical arrangement according to claim 1, wherein:
the pupil plane is identical to the reflector surface of a scanning device, and
scanning optics, a tube lens, and a microscope objective are positioned relative to one another in such a way that the illumination light is guided in lateral direction over the sample due to the scanning movement.

19. The optical arrangement according to claim 1, wherein another beam splitter is provided by means of which the detection light coming from the sample is branched off from the illumination beam path.

20. The optical arrangement according to claim 1, wherein information about beam intensity is at the outputs of the detection device, this information is compared in an evaluating device to information stored therein, and actuating signals are generated from the difference, which actuating signals are used for changing the geometry of the mirror surface and the focal length of the adaptive concave mirrors, the rotation of the change wheels or for changing the distances between the concave mirrors and the respective associated splitter surface.

21. An optical arrangement for obtaining information from a sample or an observed object, comprising:
a light source for illuminating the sample or observed object;
reception device for the light proceeding from the sample or observed object;
at least one beam splitter having a splitter surface with a transmittive area and a reflective area;
light from said source being directed to the splitter surface, reflected by the reflective area of the splitter surface to a concave mirror, focused by the concave mirror onto the transmittive area and passing through the latter; or
the light being focused onto the transmittive area, passing through the latter to a concave mirror, being directed from the concave mirror to the splitter surface and being deflected by the reflective area of the latter;
the focusing being influenced by the geometry of the mirror surface of the concave mirror and distance between the concave mirror and splitter surface;
a selected beam expansion being predetermined, or
the wavefront of the light being manipulated for purposes of optimally adapting the light:
to the characteristics of the rest of the optical component groups; or
to the optical characteristics of the sample; or
to the optical characteristics of the observed object; or
any combination thereof;
wherein the concave mirror includes a spherical concave mirror and a cylindrical concave mirror provided in the illumination beam path, detection beam path or both,
wherein the cylindrical concave mirror focuses the illumination light on the splitter surface so as to be expanded in line-shaped manner in x-direction, the splitter surface is inclined by 45° relative to the incident illumination light and has a slit-shaped opening that is likewise expanded in x-direction and forms the transmittive area, the illumination light passing through this opening, and the spherical concave mirror is arranged after the splitter surface in the direction of light flow, the illumination light being reflected back by this spherical concave mirror so as to be rotated by 90° in the y-direction to the splitter surface, where it is deflected toward the sample or toward the detection device by the reflecting rear side of the splitter surface.

22. The optical arrangement according to claim 21, wherein with respect to line scanning in the detection device, a line-shaped detector is provided, wherein the orientation of the detector line coincides with the orientation of the scan line guided over the sample.

23. The optical arrangement according to claim 21, wherein the ratio of the surface of the transmittive area to the surface of the reflective area satisfies the following condition:

$$R = \frac{A_{pupil} - A_{HT}}{A_{pupil}} = \frac{\pi \cdot r_{pupil} - 2b_{HT}}{\pi \cdot r_{pupil}}$$

where $A_{pupil}$ is the effective pupil surface, $A_{HT}$ is the surface of the transmittive area, $r_{pupil}$ is the pupil radius and $b_{HT}$ is the width of the transmittive area, where the width of the transmittive area is less than 0.25 mm and the pupil radius for the reflective area is about 5 mm.

24. An optical arrangement for obtaining information from a sample or an observed object, comprising:
   a light source for illuminating the sample or observed object;
   reception device for the light proceeding from the sample or observed object;
   at least one beam splitter having a splitter surface with a transmittive area and a reflective area;
   light from said source being directed to the splitter surface, reflected by the reflective area of the splitter surface to a concave mirror, focused by the concave mirror onto the transmittive area and passing through the latter; or
   the light being focused onto the transmittive area, passing through the latter to a concave mirror, being directed from the concave mirror to the splitter surface and being deflected by the reflective area of the latter;
   the focusing being influenced by the geometry of the mirror surface of the concave mirror and distance between the concave mirror and splitter surface;
   a selected beam expansion being predetermined, or
   the wavefront of the light being manipulated for purposes of optimally adapting the light:
      to the characteristics of the rest of the optical component groups; or
      to the optical characteristics of the samples; or
      to the optical characteristics of the observed object; or
      any combination thereof;
   wherein the concave mirror includes a cylindrical concave mirror and a spherical concave mirror provided in the illumination beam path, detection beam path or both,
   wherein the spherical concave mirror focuses the illumination light on the splitter surface in a punctiform manner, the splitter surface is inclined by 45° to the incident illumination light and has in its center a circular or elliptical opening which forms the transmittive area and through which the illumination light passes, and the cylindrical concave mirror is arranged after the splitter surface in the direction of light flow, which cylindrical concave mirror reflects the illumination light in line-shaped manner back to the splitter surface, where it is deflected toward the sample or toward the detection device by a reflecting rear side of the splitter surface.

* * * * *